(12) United States Patent
Lowe

(10) Patent No.: US 7,890,585 B2
(45) Date of Patent: Feb. 15, 2011

(54) SECOND PERSON REVIEW OF EMAIL

(76) Inventor: John C. Lowe, 5401 Westbard Ave., Apt. 1115, Bethesda, MD (US) 20816-1418

( * ) Notice: Subject to any disclaimer, the term of this patent is extended or adjusted under 35 U.S.C. 154(b) by 2024 days.

(21) Appl. No.: 10/653,259

(22) Filed: Sep. 3, 2003

(65) Prior Publication Data

US 2005/0050145 A1 Mar. 3, 2005

(51) Int. Cl.
*G06F 15/16* (2006.01)
(52) U.S. Cl. ...................................... 709/206
(58) Field of Classification Search ............... 709/206
See application file for complete search history.

(56) References Cited

U.S. PATENT DOCUMENTS

| | | | |
|---|---|---|---|
| 5,493,692 A * | 2/1996 | Theimer et al. ............ | 455/26.1 |
| 5,627,764 A | 5/1997 | Schutzman et al. ......... | 364/514 |
| 5,706,452 A | 1/1998 | Ivanov ...................... | 395/331 |
| 5,835,722 A | 11/1998 | Bradshaw et al. ...... | 395/200.55 |
| 5,850,219 A * | 12/1998 | Kumomura ................ | 715/751 |
| 5,862,223 A | 1/1999 | Walker et al. | |
| 6,065,056 A | 5/2000 | Bradshaw et al. ........... | 709/229 |
| 6,073,142 A * | 6/2000 | Geiger et al. ............... | 715/205 |
| 6,088,702 A | 7/2000 | Plantz et al. ................ | 707/103 |
| 6,393,464 B1 * | 5/2002 | Dieterman ................. | 709/206 |
| 6,405,225 B1 | 6/2002 | Apfel et al. ................. | 707/526 |
| 6,460,074 B1 * | 10/2002 | Fishkin ...................... | 709/206 |
| 6,463,462 B1 * | 10/2002 | Smith et al. ................. | 709/206 |
| 6,769,002 B2 * | 7/2004 | Ayan ....................... | 707/104.1 |
| 6,785,671 B1 | 8/2004 | Bailey et al. | |
| 6,796,486 B2 * | 9/2004 | Ohashi ...................... | 235/375 |
| 6,918,082 B1 * | 7/2005 | Gross et al. ................. | 715/206 |
| 6,931,592 B1 * | 8/2005 | Ramaley et al. ............. | 715/209 |
| 7,032,030 B1 * | 4/2006 | Codignotto ................. | 709/246 |
| 7,107,518 B2 * | 9/2006 | Ramaley et al. ............. | 715/235 |
| 7,328,244 B1 | 2/2008 | Kelley | |
| 2001/0010329 A1 * | 8/2001 | Ohashi ...................... | 235/375 |
| 2002/0016822 A1 * | 2/2002 | Ueda ......................... | 709/206 |
| 2002/0087603 A1 | 7/2002 | Bergman et al. | |
| 2002/0107928 A1 * | 8/2002 | Chalon ...................... | 709/206 |
| 2002/0131070 A1 | 9/2002 | Housel et al. | |
| 2002/0133395 A1 | 9/2002 | Hughes et al. | |

(Continued)

FOREIGN PATENT DOCUMENTS

EP 1365340 A2 * 11/2003

(Continued)

OTHER PUBLICATIONS

MAPILab Ltd. "Send if Approved Component", publicly posted Apr. 22, 2006 as evidenced by archive.org, 4 pages.*

(Continued)

*Primary Examiner*—George C Neurauter, Jr.
(74) *Attorney, Agent, or Firm*—Snyder, Clark, Lesch & Chung, LLP

(57) ABSTRACT

An email review tool gives users a simple, quick, and safe method of initiating review of an email document. The email review tool may provide a window to a user which allows the user to select another person to review the email or skip the review process and send the email directly to the recipients. Transmission of the email is thus deferred until the email has been reviewed.

13 Claims, 10 Drawing Sheets

U.S. PATENT DOCUMENTS

| | | | |
|---|---|---|---|
| 2002/0143691 | A1 | 10/2002 | Ramaley et al. |
| 2003/0018748 | A1 | 1/2003 | McKenna, Jr. |
| 2004/0010557 | A1* | 1/2004 | Chapman et al. ............ 709/206 |
| 2005/0004950 | A1* | 1/2005 | Ciaramitaro et al. ..... 707/104.1 |
| 2005/0021637 | A1* | 1/2005 | Cox ........................... 709/206 |
| 2005/0091385 | A1* | 4/2005 | Nordstrom ................. 709/228 |
| 2005/0108232 | A1* | 5/2005 | Rockey ........................... 707/8 |
| 2005/0120127 | A1* | 6/2005 | Bradley et al. .............. 709/231 |
| 2005/0135681 | A1* | 6/2005 | Schirmer .................... 382/229 |

FOREIGN PATENT DOCUMENTS

| | | |
|---|---|---|
| JP | 3188561 | 8/1991 |
| JP | 2002230146 | 8/2002 |

OTHER PUBLICATIONS

Microsoft Corporation. "About Delegate Access". Retrieved from the help file of Microsoft Office 2003 originally released Oct. 21, 2003, 1 page.*

Microsoft Corporation. "Change Permissions for a delegate". Retrieved from the help file of Microsoft Office 2003 originally released Oct. 21, 2003, 1 page.*

CINPHONY Email Application Brief; 8 pages.

NetVIA Customer Brief: An influx of e-mails demands a change in member service, 4 pages.

"Flaming E-mail might come back to haunt you," PC Week/Netweek N/4; May 8, 1995; 1 page.

Business Wire, Jul. 30, 2001: "Cintech Turbo-Charges NetVIA With Powerful E-mail Management Enhancements-E-contact Center Adds Supervisor Review, Tracking, Other Functions-," 3 pages.

PR Newswire, pp. 8942, Apr. 13, 1999: "Enhanced Version Will Expand Functionality For Independent Contractor Support and Internal E-Mail Messages," 3 pages.

Craig Bingham: "Peer review on the Internet: a better class of conversation," Lancet, vol. 351, No. 9106, pp. SI 10(5), Mar. 21, 1998; 9 pages.

Co-pending U.S. Appl. No. 11/063,562, entitled "Email Classifier," by John C. Lowe, filed Feb. 24, 2005, 42 pages.

* cited by examiner

SECOND PERSON REVIEW OF EMAIL

BACKGROUND OF THE INVENTION

A. Field of the Invention

The present invention relates generally to electronic communications, and more particularly, to communications via electronic mail.

B. Description of Related Art

Electronic mail (email) has become a relatively common communication medium. Email messages generally arrive quickly (i.e., minutes or less), unobtrusively, and are cheap. For these reasons, email is used extensively in the modern world.

Although email is often thought of as an "informal" communication medium, email is increasingly being used to transmit more formal information. For example, legal and other professional services are increasingly using email to transmit legal and financial documents that would traditionally be sent via postal mail or courier. Some courts, for instance, no longer accept paper filings and instead require electronic filings. One consequence of this juxtaposition of formal documents in a traditionally informal communication medium is that formal documents that would normally be reviewed by one or more persons for content and grammatical accuracy are sent via email without the same level of review.

Accordingly, it would be desirable to effectively impose a greater level of review on certain email communications.

SUMMARY OF THE INVENTION

Aspects consistent with the present invention provide an email review tool that reminds an email sender that an email may need to be reviewed by a second person before being sent. The email review tool includes an interface for facilitating second person review.

One aspect of the invention is directed to a method for facilitating second person review of an email document destined for one or more addressees. The method includes presenting a graphical window to an email sender. The graphical window receives information from the email sender describing a request for a second person review of the email, where the information includes an identification of at least one person to perform the second person review. The method further includes transmitting the request for the second person review to the person identified to perform the second person review and transmitting a reviewed version of the email document to the one or more addressees.

Another aspect of the invention is directed to an email review tool that includes a first graphical window presented to an email sender when the email sender attempts to send an email document to an addressee. The first graphical window may remind the email sender that the email document should be reviewed by a second person before the email document is sent to the addressee. The first graphical window additionally includes a review field configured to receive information identifying a reviewer of the email document, a skip review option through which the email sender may direct that a second person review should be skipped and the email document transmitted to the addressee, and a send for review option through which the email sender may transmit the email document to the reviewer identified in the review field.

Another aspect of the invention is directed to a method that includes displaying a graphical window to a user of an email program when the user selects a send option of the email program. The graphical window includes a review field configured to receive information identifying a reviewer of an email document, a skip review option through which the user may direct that a second person review of the email document should be skipped and the email document transmitted to an addressee of the email document, and a send for review option through which the user may initiate transmission of the email document to the reviewer identified in the review field.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

An email review tool facilitates review of documents transmitted by email. The review tool may provide a "pop-up" window that is presented to a user when the user sends the email. The pop-up window allows the user to select another person to the email or skip the review process and send the email directly to the recipients. The email review tool makes it less likely that users will inadvertently transmit a formal communication without a proper level of peer or supervisor review.

Exemplary System Configuration

Figure 1:
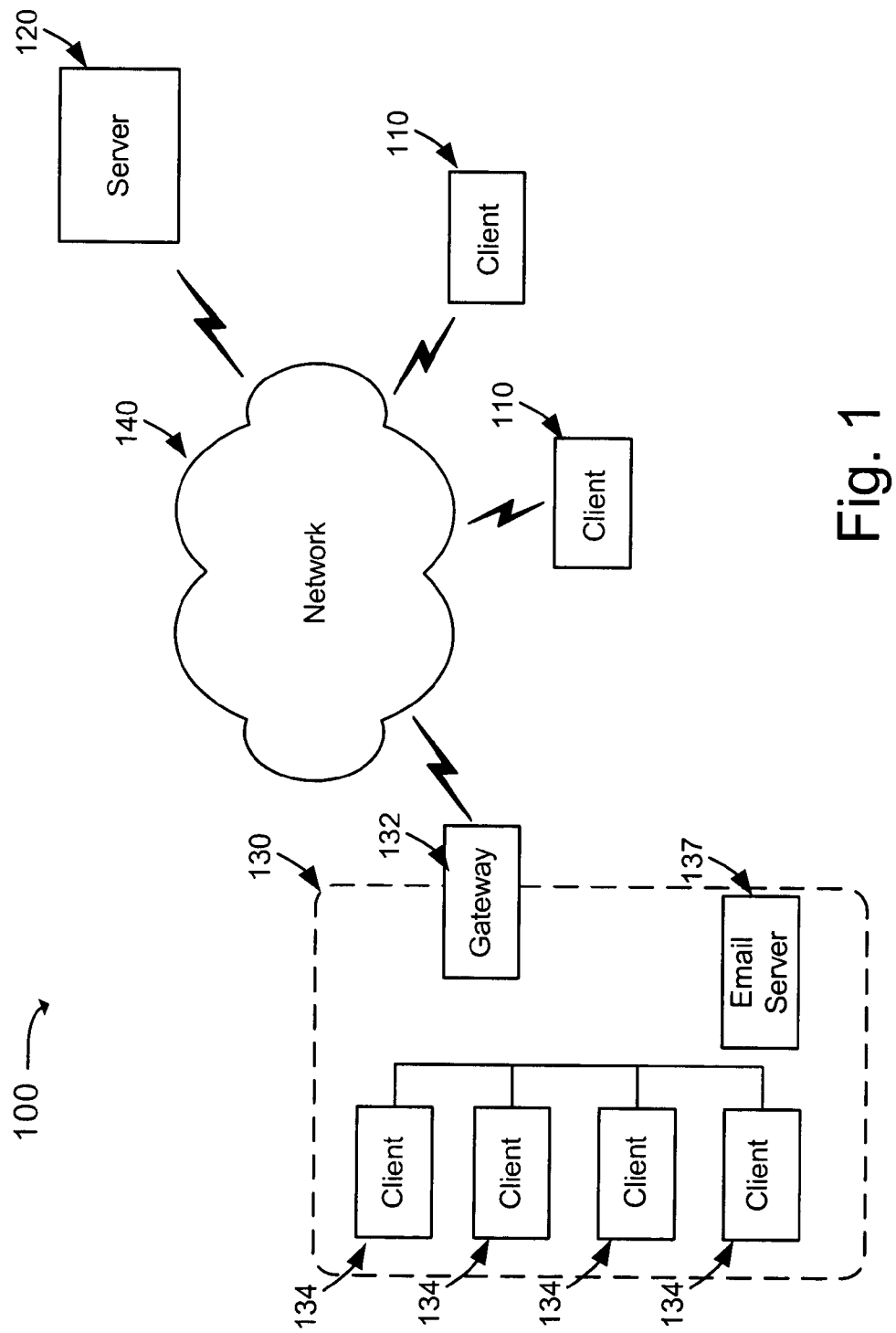
FIG. 1 is an exemplary diagram of a system in which systems and methods consistent with the principles of the invention may be implemented.
Figure 3:
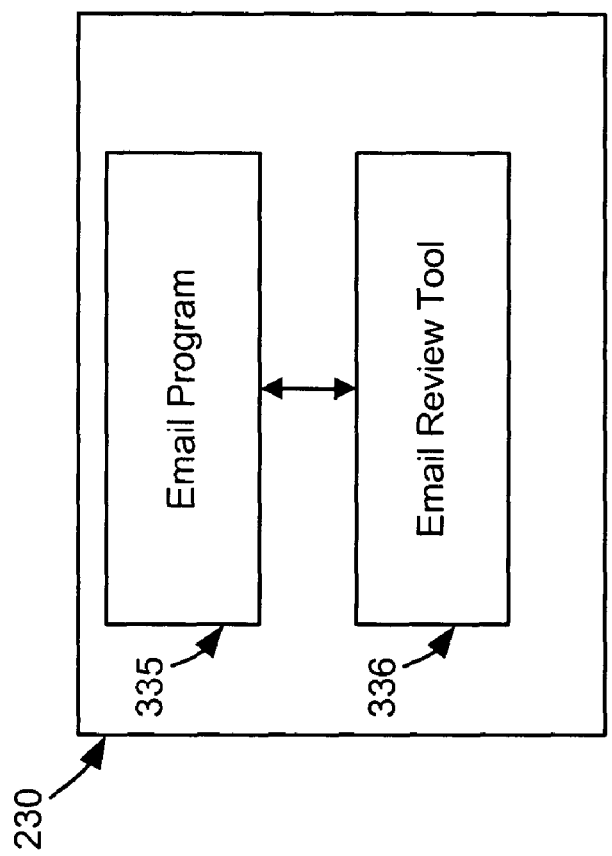
FIG. 3 is a diagram conceptually illustrating a computer-readable medium in one of the client entities shown in FIGS. 1 and 2.

FIG. 1 is an exemplary diagram of a system 100 in which systems and methods consistent with the principles of the invention may be implemented. System 100 may include a network 140 (or other communication link) that connects multiple computing entities, such as clients 110, a server 120, and proprietary sub-networks (such as a corporate network) 130. Network 140 may be the Internet, although more generally network 140 may include a local area network (LAN), a wide area network (WAN), a telephone network, such as the Public Switched Telephone Network (PSTN), an intranet, or a combination of networks. Two clients 110, a server 120, and a proprietary sub-network 130 are illustrated in FIG. 3 for simplicity. In practice, there may be more or fewer clients 110, servers 120, and sub-networks 130.

Clients 110 may include client entities. An entity may be may defined as a computing device, such as a wireless telephone, a personal computer, a personal digital assistant (PDA), a lap top, another type of computation or communication device, a thread or process running on one of these devices, and/or an object executable by one of these device. Server 120 may include a server entity that performs network functions, such as email services. Clients 110 and server 120 may connect to network 140 via wired, wireless, or optical connections.

Sub-network 130 may be a network such as a corporate network. A gateway 132 may restrict access to sub-network 130 to authorized users. Gateways are generally known in the art and may act as a node in system 100 that serves as an entrance to sub-network 130. Gateway 132 may additionally act as a proxy server and/or a firewall server to restrict access to and protect sub-network 130. Sub-network 130 may additionally include a number of clients 134, which may be similar to clients 110. In one implementation, clients 134 may be personal computers that are operated by users (e.g., employees) in sub-network 130. Clients 134 may be grouped together as a LAN.

Clients 134 may exchange email with one another and with other devices in system 100, such as clients 110 and server 120. Reading, managing, and composing email messages may be performed at clients 134 using client email software. Clients 110 may include similar (or compatible) email software. There are a number of well known and commercially available client email software packages.

Sub-network 130 may additionally include an email server, such as email server 137. Email server 137 may facilitate the sending and receiving of email messages among clients 134 or between clients 134 and other devices in system 100, such as clients 110. Email server 137 may, for instance, collect email sent from clients 134. The collected email may then be forwarded toward its final destination using a messaging protocol, such as the Simple Mail Transfer Protocol (SMTP). SMTP is a well known protocol for sending and receiving email. External email destined to one or more of clients 134 may be first received at email server 137 and then forwarded to the destination client(s) 134.

Clients 110 may also send/receive email. Server 120 may, for example, be configured to act as an email server that clients 110 access when sending mail or when checking whether mail has been received at server 120. In situations in which client 110 is associated with sub-network 130, such as an employee that is traveling or working from home, client 110 may send/receive email by accessing email server 137 through gateway 132.

Exemplary Client/Server Architecture

Figure 2:
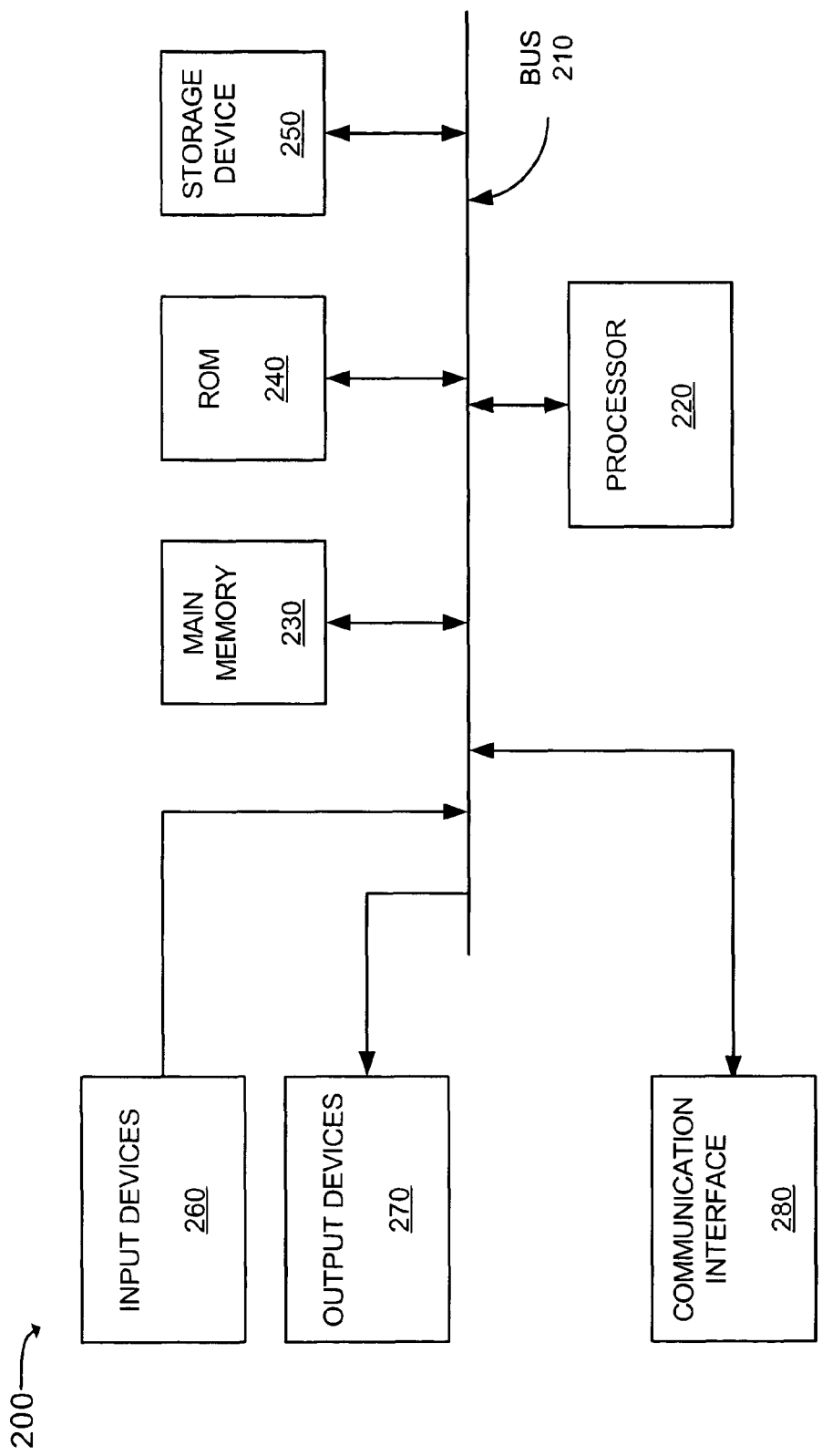
FIG. 2 is an exemplary diagram of a client or server entity according to an implementation consistent with the principles of the invention.

FIG. 2 is an exemplary diagram of one of clients 110/134 or servers 120/137, labeled as computing device 200. Computing device 200 may include a bus 210, a processor 220, a main memory 230, a read only memory (ROM) 240, a storage device 250, one or more input devices 260, one or more output devices 270, and a communication interface 280. Bus 210 may include one or more conductors (or other data transmission links) that permit communication among the components of computing device 200.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to computing device 200, such as a keyboard, a mouse, a pen, voice recognition and/or biometric mechanisms, etc. Output device (s) 270 may include one or more conventional mechanisms that output information to the user, including, but not limited to, a display, a printer, or a speaker. Communication interface 280 may include any transceiver-like mechanism that enables computing device 200 to communicate with other devices and/or systems.

As will be described in detail below, clients 110 and 134, consistent with the principles of the invention, perform certain email-related operations. Clients 110 may perform these operations in response to processor 220 executing software instructions contained in a computer-readable medium, such as memory 230. A computer-readable media may include, but are not limited to, one or more physical or logical memory devices and/or carrier waves.

FIG. 3 is a diagram conceptually illustrating a portion of a computer-readable medium, such as memory 230, in one of clients 110/134. Memory 230 may include an email program 335 and an email review tool 336. Email program 335 may include conventional email software that is used to send and receive email. Email review tool 336 may assist users of clients 110/134 in using email program 335 in a manner consistent with aspects of the invention for facilitating second person review of email. Email review tool 336 may be implemented as an "add-in" module to email program 335, it may be integrated with email program 335, or it may be implemented as a separate program that monitors the operation of email program 335 and intercepts input/output information flows from email program 335.

The software instructions that define email program 335 and email review tool 336 may be read into memory 230 from another computer-readable medium, such as data storage device 250, or from another device via communication interface 280. Alternatively, custom circuitry may be used in place of or in combination with software instructions to implement processes consistent with the present invention. Thus, implementations consistent with the principles of the invention are not limited to any specific combination of circuitry and software.

Operation of Email Review Tool

Email review tool 336, as described below, provides users with a simple, quick, and safe method for implementing second person review before sending an email to an outsider, such as a client.

Figure 4:
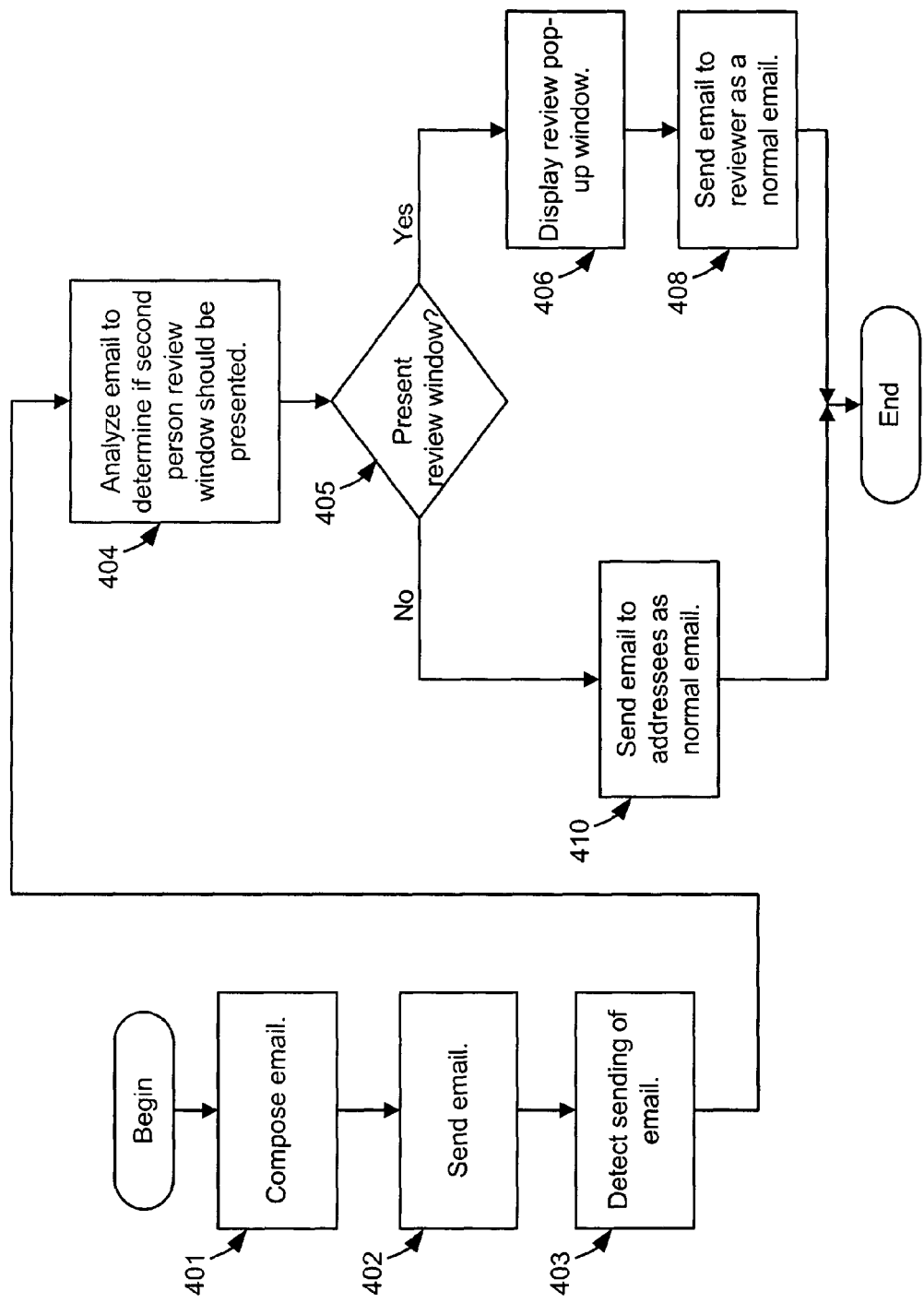
FIG. 4 is a flow chart illustrating operation of an email review tool consistent with aspect of the invention.

FIG. 4 is a flow chart illustrating operation of email review tool 336 consistent with an aspect of the invention. To begin, a user at one of clients 110/134 may compose an email message in the normal manner using email program 335 (act 401).

Figure 5:
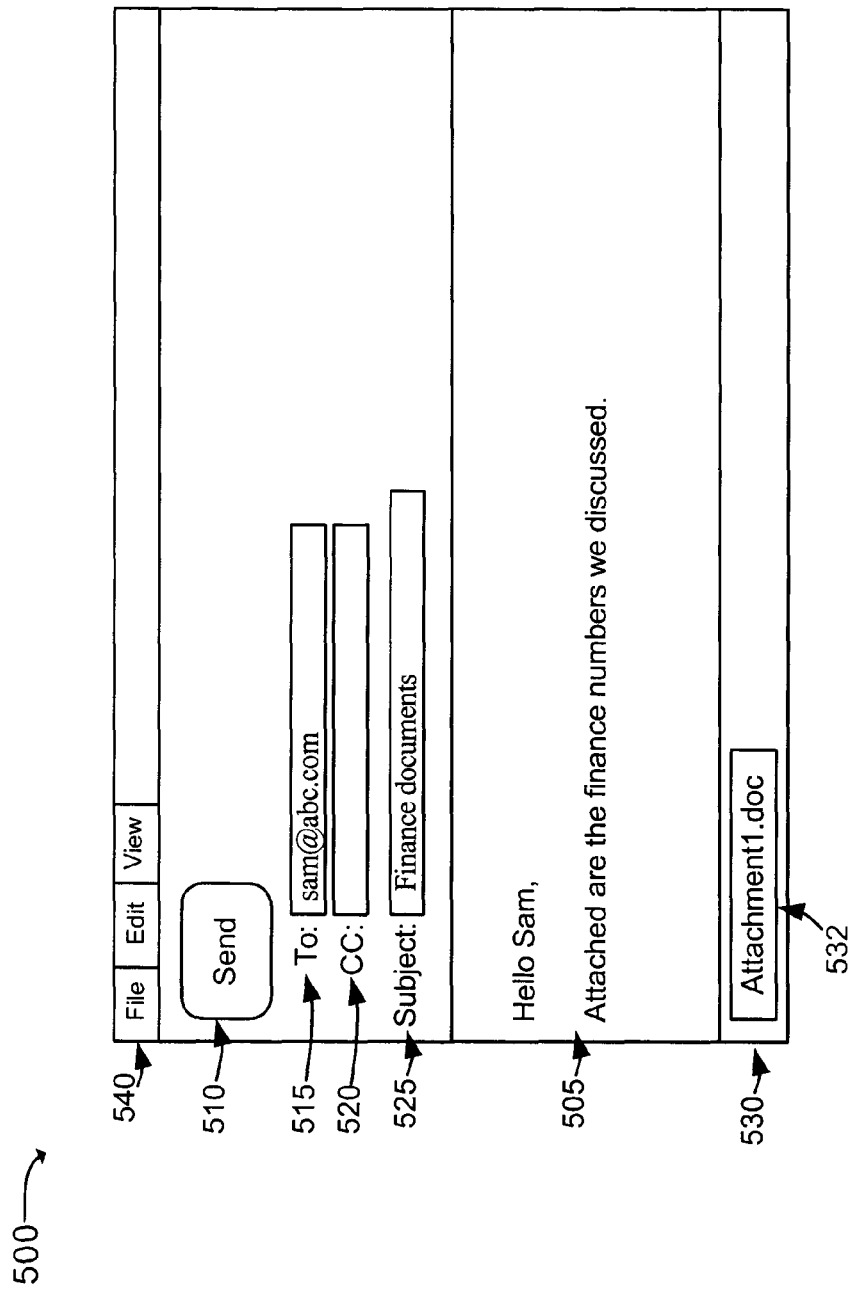
FIG. 5 is diagram illustrating an exemplary graphical interface of an email program through which a user may compose an email message.

FIG. 5 is a diagram illustrating an exemplary graphical interface 500 of email program 335 through which a user may compose an email message. Email interface 500 may include a composition section 505, a "send" command option (e.g., an icon) 510, a "To" address field 515, a "CC" address field 520, a "Subject" field 525, and an attachment section 530. Email interface 500 may also include a menu bar 540 through which various other email-related operations may be performed. For clarity, email interface 500 is shown in a simplified form. One of ordinary skill in the art will recognize that a typical email interface may include numerous other commands or options.

In composition section 505, the user may type or otherwise enter text, graphics, audio, or video that are to be included in the email. In the example shown, the user has also included another file in the email, shown as attachment 532 ("attachment1.doc") in attachment section 530. Attachment 532 may be, for example, any type of text or word processing file, a video file, or an audio file. Attachment 532 may be considered part of the email. In the "To" address field 515, the user may enter the intended recipient(s) of the email. In many email programs, the recipients may be typed in manually or selected from a contact list. Additional recipient(s) may be added in "CC" field 520. In subject field 525, the user may enter a subject for the email.

After composing the email, the user may instruct email program 335 to send the email (act 402). In many email programs, the send command may be initiated by selecting send option 510. Send option 510 may be implemented in the form of an icon or software button.

Email review tool 336 may determine when an email is sent (act 403). If email review tool 336 is integrated directly into email program 335 or as an add-in module, this determination can be made through direct communication with email program 335. In this situation, although send option 510 may have been selected by the user, email program 335 may not actually send the email to email server 120/137. If email review tool 336 is implemented as a separate program that monitors the operation of email program 335, this determination may be made by monitoring an output of email program 335 and intercepting attempts to send an email.

In some implementations, email review tool 336 may next analyze the email to determine if a second person review window should be presented to the user before actually transmitting the email to email server 120 or 137 (acts 404 and 405). Whether or not the second person review window is presented may be based on a user or network administrator configurable set of rules. For example, email review tool 336 may be configured to examine the To field 515 and skip the review window when all the recipients of the email have addresses within sub-network 130. In this way, when sending internal emails, which can often afford to be less formal than external emails, the user is not presented with a second person review window. One of ordinary skill in the art will recognize that other rules could be applied by email review tool 336. For example, the user may be able to specify certain email addresses or domains for which the second person review window may not be shown.

For emails for which a second person review window applies, email review tool 336 may present a "pop-up" window (or other indication) to the user that asks the user to enter information relating to review of the email (act 406). For emails in which a pop-up window is not presented to the user, email program 335 may send the email as normal using email server 120 or 137.

Figure 6:
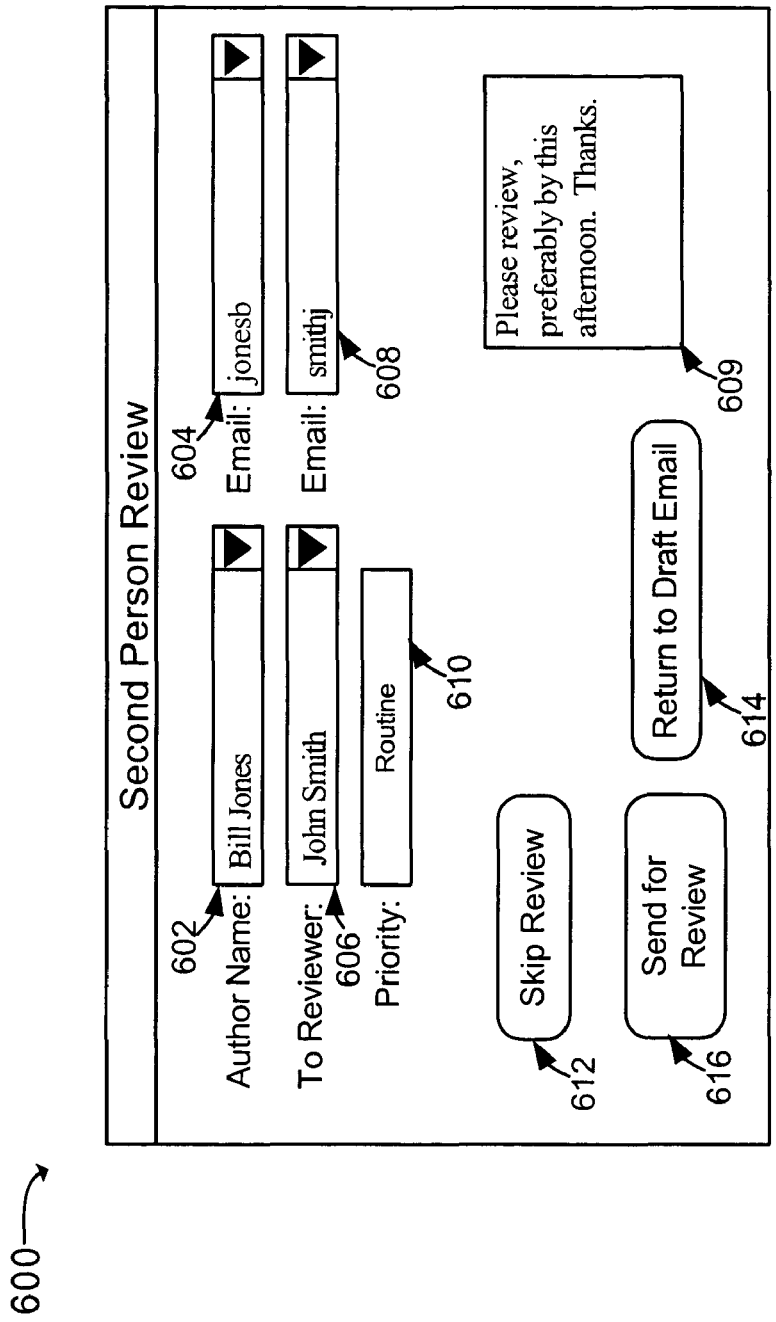
FIG. 6 is a diagram illustrating an exemplary interface for a second person review pop-up window that may be presented to a user.

FIG. 6 is a diagram illustrating an exemplary interface for a second person review pop-up window 600 that may be presented to the user in act 406. Through window 600, the user may enter information used to facilitate the second person review. Window 600 may include an author name field 602 and an author email field 604, which may display the name and email address of the author, respectively. Review tool 336 may, by default, insert the name and email address of the user of email program 335 into name field 602 and email field 604, respectively. In other words, review tool 336 may assume that the person currently logged into client 110/134 is the author. If this is not the case, the user may edit fields 602 and 604, by entering the correct information or selecting the information, via a drop down window that provides additional names and/or email addresses.

In reviewer name field 606 and reviewer email field 608, the user may enter the and email address of the intended reviewer(s). In some implementations, the user may only need to fill in one of fields 606 and 608. Based on the information in the filled-in field, email review tool 336 may automatically populate the other field. In other implementations, the "reviewer" may actually be an automated review device, such as a network computer dedicated to checking emails for certain format conventions.

The user may optionally enter a descriptive priority of the email in priority field 610. Priority field 610 may be editable through a drop-down window in which the user may choose from priority levels such as "routine" (default level), "urgent," and "low."

A comment field 609 may also be included in pop-up window 600. In comment field 609, a short message may be entered for the reviewer.

Pop-up window 600 may additionally include a number of additional command options, such as "skip review" option 612, "return to draft email" option 614, and "send for review" option 616. Skip review option 612 may allow the user to skip the second person review and have the email instead sent as a normal email to the destination address(es) (i.e., the email addressees specified in To field 515 and CC field 520). Return to draft email option 614 may cause email review tool 336 to exit and return the user to email interface 500, where the user can continue to compose the email. Send for review option 616 may cause email review tool 336 to send the email to the viewer(s) entered in fields 606 and 608.

In some implementations, pop-up window 600 may include other options to second person review of email. For example, there may be an option to the reviewer to send the reviewed email directly to its final addressees if the reviewer does not have any changes. Also, there may be an option to allow the user to input a filing location for a hard copy of the email. Also, there may be an option to allow the user to input a date when the email can be deleted as part of a document retention program. Also, there may be an option to enable the reviewer to send the reviewed email directly to its final addressees, incorporating any changes the reviewer made to the document. Also, there may be an option to enter an identification number, such as a client number, that is associated with the email. One of ordinary skill in the art will recognize that options relating to second person review, other than those discussed above, may be included and configured through pop-up window 600.

Returning to FIG. 4, assuming that the user transmits the email to the reviewer, such as by selecting send for review icon 616, the email may then be sent to the reviewer (act 408). The email may be transmitted to the reviewer as a normal email via email server 120/137. In one implementation, email review tool 336 may modify subject field 525 to reflect the fact that a second person review of the email is being requested.

Figure 7:
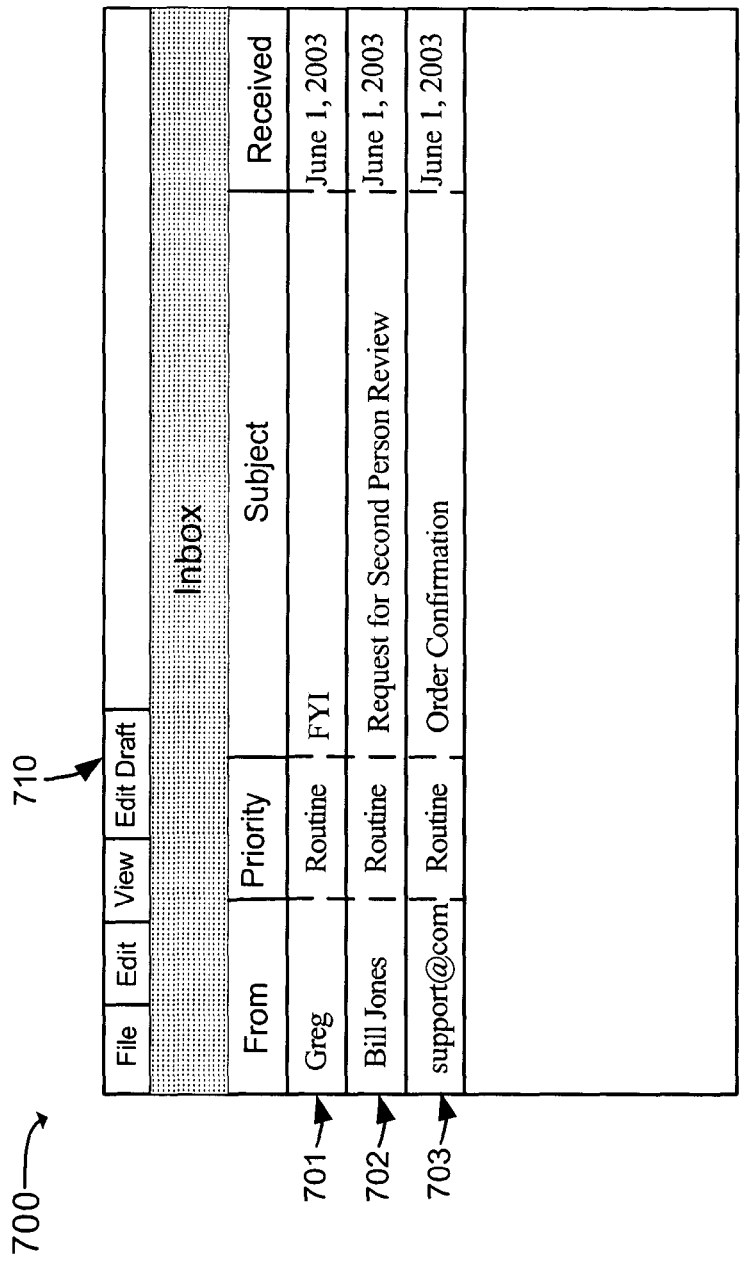
FIG. 7 is a diagram illustrating an exemplary interface of an "in-box" of an email program.

FIG. 7 is a diagram illustrating an exemplary interface 700 of an "in-box" of email program 335. As shown, a number of email messages 701-703 may be present and ready to be read. Email message 702, in particular, may be a second person review email. Email review tool 336 may use a standard text identifier, such as "Request for Second Person Review," to identify the email 702 as a second person review request.

The reviewer (e.g., the user of in-box 700) may select email 702 to review and potentially make changes to email 702 and/or its attachments. In one implementation, the reviewer may select an "edit draft" icon 710 to initiate viewing and editing of email 702.

Figure 8:
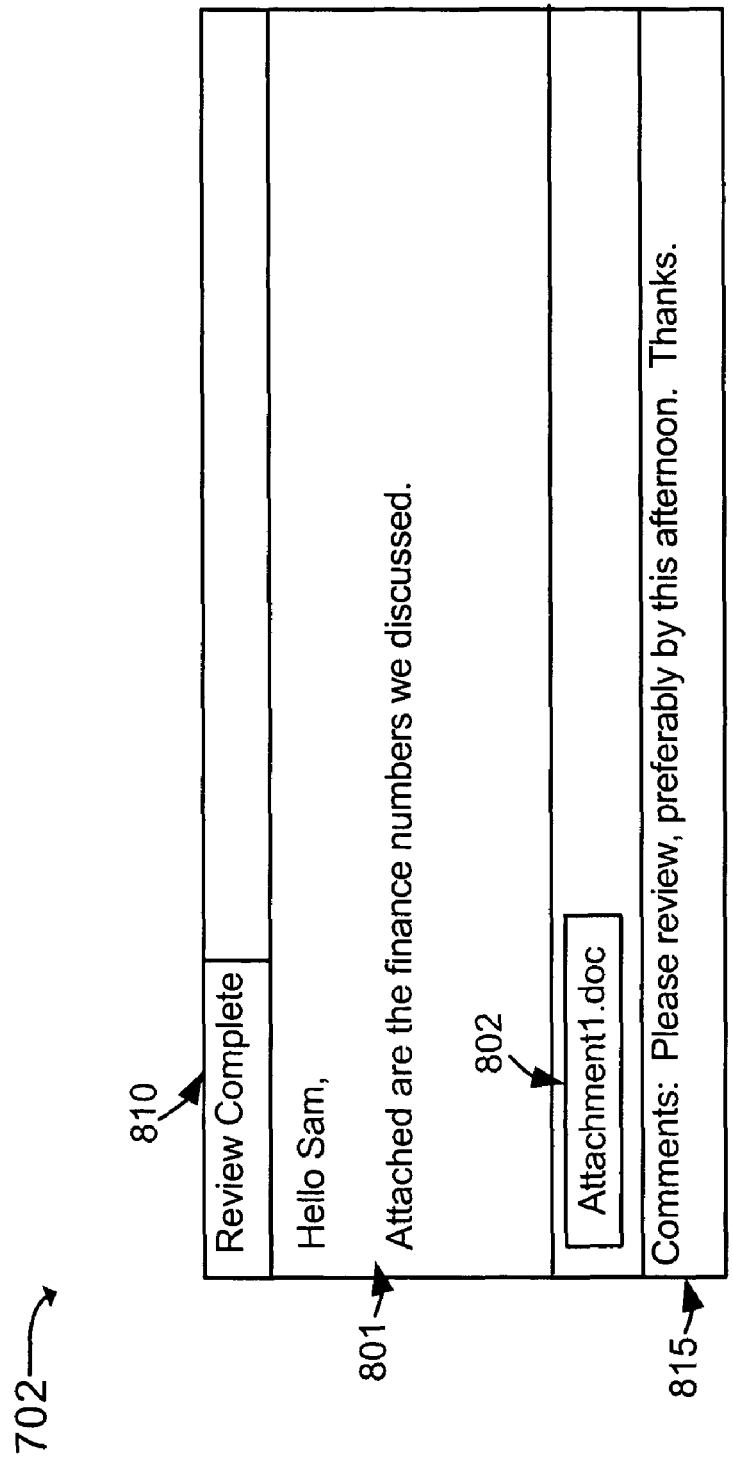
FIG. 8 is a diagram illustrating an exemplary interface presented to a reviewer that editing an email.

FIG. 8 is a diagram illustrating an exemplary interface presented to a reviewer that is editing an email (e.g., email 702). Body 801 of email 702 is displayed to the reviewer in a text editable format. The reviewer may make desired changes to the text in body 801. Any comments entered in field 609 (FIG. 6) may also be displayed to the reviewer, as shown in field 815. Additionally, the reviewer may select attachments, such as attachment 802. In response, the email review tool may run an editing program appropriate for the attachment. For example, if the attachment is a word processing document, clicking on the attachment may cause email review tool 336 to run the corresponding word processing program.

When the reviewer has finished the review, the reviewer may select review complete option 810 to send the email, including any changes to body 801 or attachment 802, back to the author. Optionally, email review tool 336 may include fields in which the reviewer can identify additional people to whom the reviewer would like to send the reviewed email.

Email review tool 336, in response to selection of review complete icon 810, may send email 702 back to the author. The reviewed email may be viewable by the author as a normal email. The reviewed email may include distinctive text in the subject line, such as "Completed Second Person Review" that identifies the email as being a returned second person review request.

The author may select the reviewed email to again initiate email interface 500, where the author may view and edit the contents of the email, including any changes made by the reviewer. In one implementation, email review tool 336 may present the changes using a distinctive font, such as red text to indicate additions and red strikethough text to indicate deletions. The author may further edit the reviewed email. When the author is done editing, or if the author is satisfied with the changes, the author may accept the changes and then forward the edited email to its intended addressees (i.e., the addressees in fields 515 and 520). For example, the author may select send icon 510 and skip review icon 612 to forward the email to the intended addressees.

Figure 9:
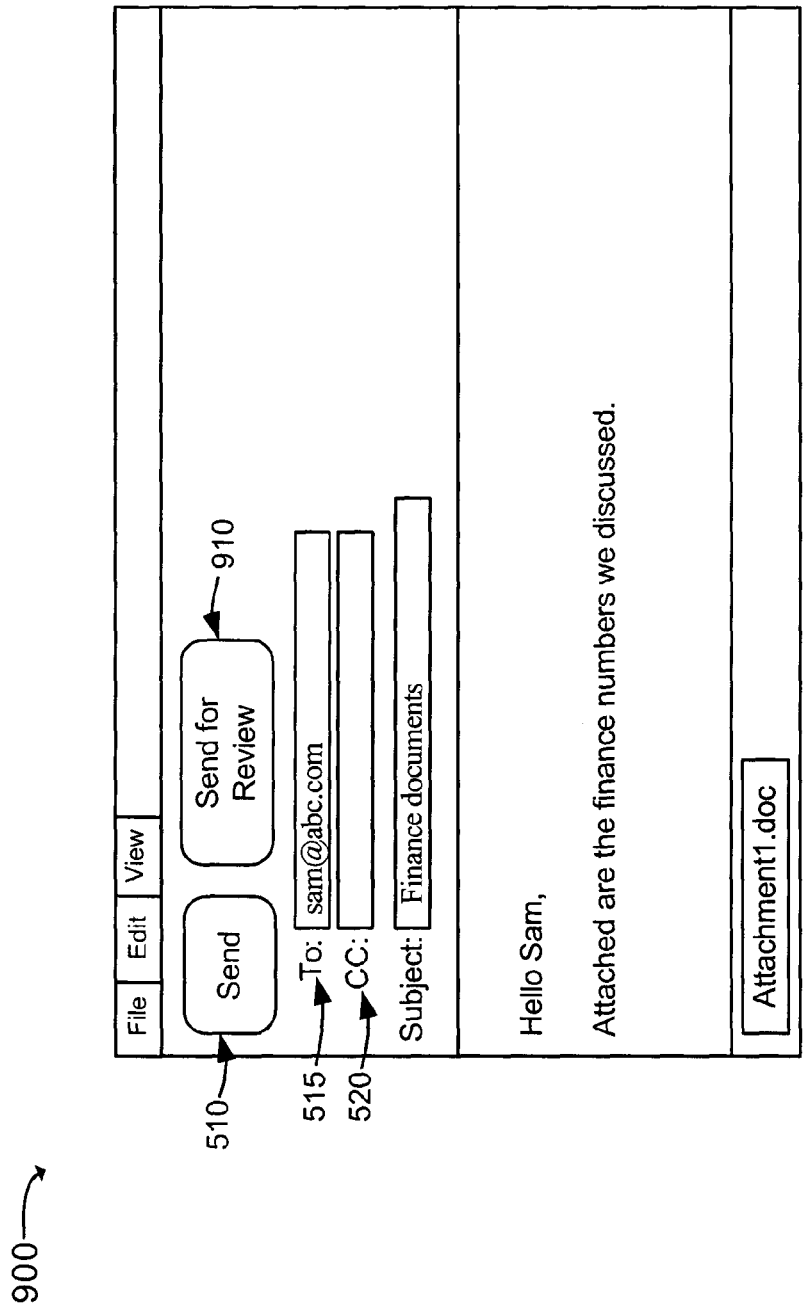
FIG. 9 is a diagram illustrating an exemplary graphical interface of an email program consistent with an alternate aspect of the invention.

FIG. 9 is a diagram illustrating an exemplary graphical interface 900 of email program 335 consistent with an alternate aspect of the invention. Graphical interface 900 is similar to graphical interface 500, except that graphical interface 900 additionally includes a "send for review" option 910. By placing option 910 in the main email composition interface, the user has the opportunity to affirmatively choose to send the email for review at an earlier stage in the email process. Selecting send for review option 910 may present the user with a second person review window such as window 600. In this implementation, selecting send option 510 may skip the second person review window 600 and immediately send the email to the addressees in fields 515 and 520.

Figure 10:
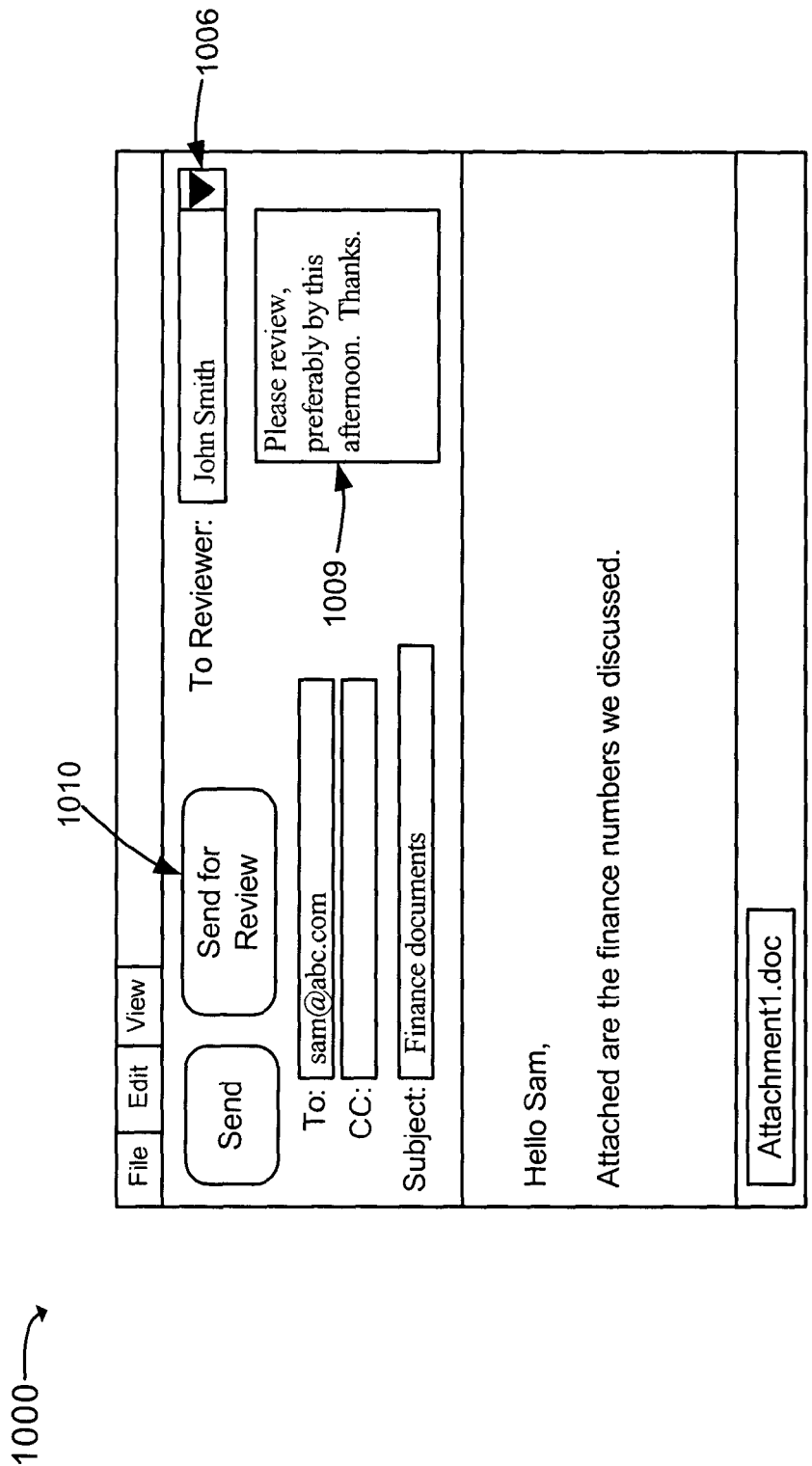
FIG. 10 is a diagram illustrating an exemplary graphical interface of an email program consistent with yet another alternate aspect of the invention.

FIG. 10 is a diagram illustrating an exemplary graphical interface 1000 of email program 335 consistent with yet another aspect of the invention. Graphical interface 1000 is similar to graphical interface 900, except that graphical interface 1000 includes additional information relating to the second person review. For example, a reviewer name field 1006 and comment field 1009, which function similarly to fields 606 and 609 (FIG. 6), may also be included in graphical interface 1000. In this manner, the email sender can fill in basic email information as well as the second person review information in a single graphical interface. In this implementation, selecting send for review option 1010 may send the email directly to the reviewer without the need for another window.

CONCLUSION

The email review tool described above gives users a simple, quick, and safe method of initiating review of an email document. The email is not sent to the final addressee until the email has been reviewed.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code-it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although email review tool 336 was described as being implemented on client computing devices, the programming logic that defines email review tool 336 may instead be implemented at the email server or at a combination of the email server and client. Additionally, although a number of exemplary graphical user interfaces were illustrated, one of ordinary skill in the art will recognize that these interfaces are exemplary only, and that other interfaces could be used that perform similar or the same functions.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for facilitating second person review of an electronic mail ("email") destined for one or more destination addresses, the method comprising:

presenting a first graphical window to an email sender, the first graphical window configured to receive information from the email sender describing a request for a second person review of the email, the information including an identification of at least one person other than the email sender to perform the second person review;

transmitting the request for the second person review to at least one address, different than the one or more destination addresses, associated with the at least one person identified to perform the second person review;

presenting a second graphical window to the at least one person to perform the second person review, the second graphical window configured to allow the at least one person to view and edit contents of the email to generate a reviewed version of the email; and transmitting the reviewed version of the email to the one or more destination addresses.

2. The method of claim 1, wherein the first graphical window is presented to the email sender in response to the email sender selecting a send email option in an email program.

3. The method of claim 2, further comprising:
blocking the presentation of the first graphical window to the email sender in situations determined based on the one or more destination addresses.

4. The method of claim 3, wherein the first graphical window is blocked when all of the one or more destination addresses correspond to internal email addresses.

5. The method of claim 1, wherein the first graphical window includes an option to redisplay an email editing program to allow the email sender to edit the email, the method further comprising receiving, from the email sender, an indication of a selection of the option to redisplay the email editing program.

6. The method of claim 1, wherein the first graphical window includes an option to input information indicating where to file a hardcopy of the email, the method further comprising receiving, from the email sender, the information indicating where to file the hardcopy of the email.

7. The method of claim 1, wherein the first graphical window includes an option to input information indicating a date to delete the email, the method further comprising receiving, from the email user, the information indicating the date to delete the email.

8. The method of claim 1, wherein the information describing the request for the second person review additionally includes at least one of an author name or an email priority.

9. The method of claim 1,
wherein the information describing the request for the second person review includes comments from the email sender to the at least one person to perform the second person review, and
wherein transmitting the request for the second person review includes transmitting the comments from the email sender to the at least one address associated with the at least one person to perform the second person review.

10. The method of claim 1, wherein transmitting the request for the second person review additionally includes:
transmitting the request as an email to the at least one person identified to perform the second person review.

11. The method of claim 10, wherein transmitting the request as the email includes transmitting the email including a subject line identifying the email as an email requesting second person review.

12. The method of claim 1,
wherein the second graphical window additionally includes a review complete option through which the at least one person performing the second person review indicates that the second person review is complete.

13. The method of claim 1, further including:
transmitting the reviewed version of the email document to an address associated with the email sender; and
presenting a third graphical window to the email sender, the third graphical window being configured to accept a command that initiates sending of the reviewed version of the email to the one or more destination addresses.

* * * * *